F. B. Parker.
Revolving Rake.
N° 9956          Patented Aug. 23, 1853.
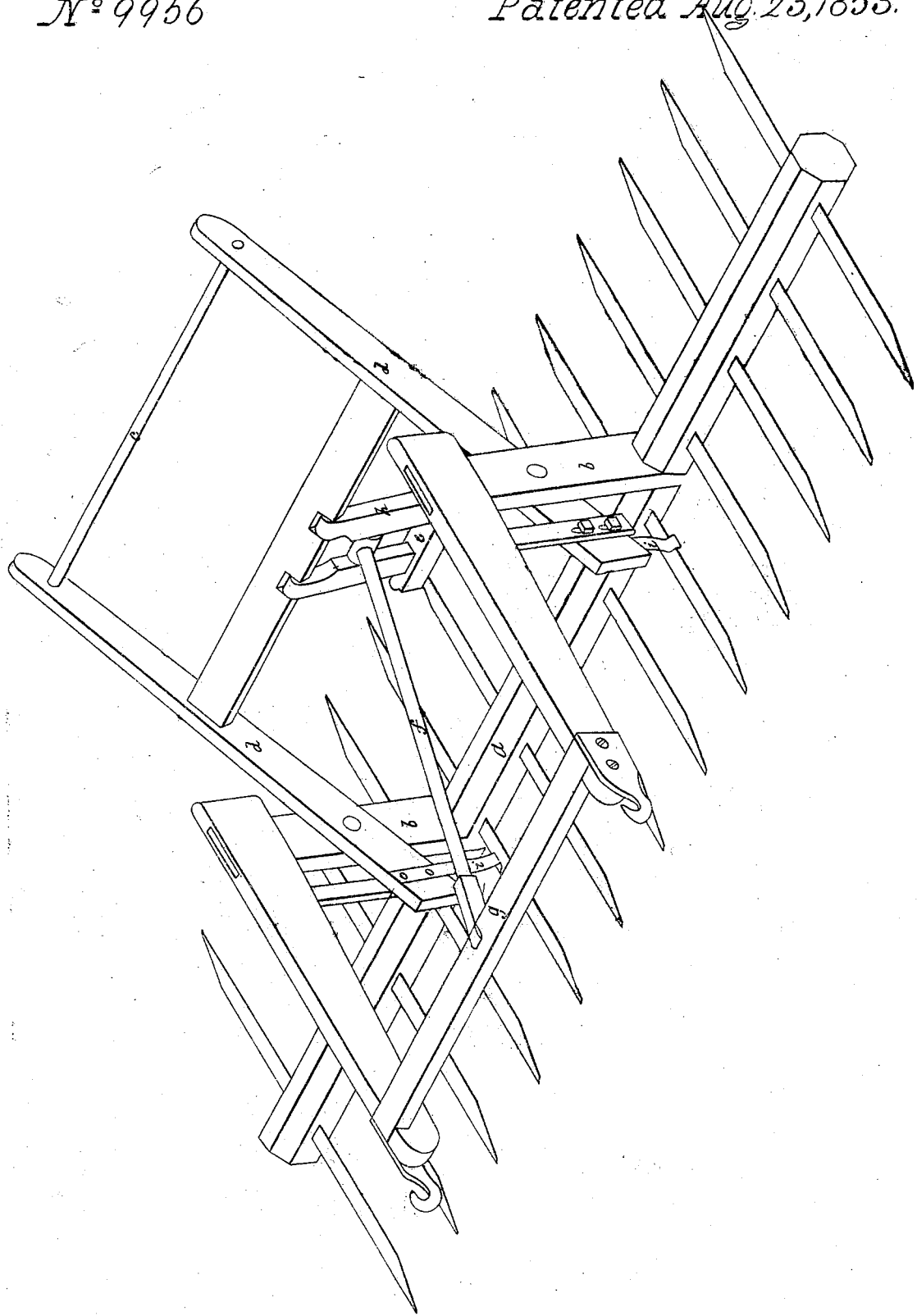

UNITED STATES PATENT OFFICE.

FREDERICK B. PARKER, OF QUEENSVILLE, INDIANA.

IMPROVEMENT IN HAY-RAKES.

Specification forming part of Letters Patent No. 9,956, dated August 23, 1853.

*To all whom it may concern:*

Be it known that I, FREDERICK B. PARKER, of Queensville, Jennings county, Indiana, have invented a new and useful Improvement in Revolving Horse-Rakes; and I do hereby declare the following to be a full, clear, and exact description thereof, reference being had to the annexed drawings, making part of this specification.

The object of my invention is to provide an efficient preventive to the accidental tipping of the rake.

In the accompanying drawings, a rake embodying my improvement is represented in perspective.

$a$ is the rake proper. $b$ are the standards; $c$, the handle; $d$, the handle-bars; $e$, the main stop, resting on the back tines; $f$, the connecting-rod from the front rail, $g$, of the handle-frame to the helve $h$ of the stop, all which may be of usual construction.

The device by means of which I prevent the tipping of the rake by any other force than the intentional one of the operator on the handle consists of a pair of steel springs, $i$, attached to the front ends of the handle-bars and projecting downward. These springs terminate at their lower ends in bent lips, as represented, so as to form catches resting upon the edges of two of the front tines in such a way as, on the one hand, to hold them down with sufficient force, and, on the other hand, to allow them to slip past when released by the forward pressure of the operator against the handle, which, by lifting the hind stop out of the way of the back tines, permits the revolution of the rake in the usual way.

I claim as new and desire to secure by Letters Patent—

The spring-catches projecting downward from the front ends of the hand-bars and provided with sloping lips, which, bearing upon the front tines, assist in holding the rake to its place until relieved by the withdrawal of the main stop, in the manner described.

In testimony whereof I have hereunto set my hand before two subscribing witnesses.

FREDERICK B. PARKER.

Witnesses:
G. P. CAMPBELL.
I. B. CURTIS.